US010883969B2

(12) United States Patent
Ducousso

(10) Patent No.: US 10,883,969 B2
(45) Date of Patent: Jan. 5, 2021

(54) SYSTEM AND METHOD FOR INSPECTING A STRUCTURE WITH CODA ACOUSTIC WAVES

(71) Applicant: SAFRAN, Paris (FR)

(72) Inventor: Mathieu Loïc Ducousso, Moissy-Cramayel (FR)

(73) Assignee: SAFRAN, Paris (FR)

(*) Notice: Subject to any disclaimer, the term of this patent is extended or adjusted under 35 U.S.C. 154(b) by 153 days.

(21) Appl. No.: 16/094,373

(22) PCT Filed: Apr. 21, 2017

(86) PCT No.: PCT/FR2017/050946
§ 371 (c)(1),
(2) Date: Nov. 1, 2018

(87) PCT Pub. No.: WO2017/182761
PCT Pub. Date: Oct. 26, 2017

(65) Prior Publication Data
US 2019/0145937 A1 May 16, 2019

(30) Foreign Application Priority Data

Apr. 21, 2016 (FR) .................... 16 53518

(51) Int. Cl.
G01N 29/06 (2006.01)
G01N 29/24 (2006.01)
(Continued)

(52) U.S. Cl.
CPC ....... G01N 29/045 (2013.01); G01N 29/0645 (2013.01); G01N 29/2418 (2013.01);
(Continued)

(58) Field of Classification Search
CPC ............... G01N 29/50; G01N 29/0645; G01N 29/2418; G01N 29/2431; G01N 29/045;
(Continued)

(56) References Cited

U.S. PATENT DOCUMENTS 4,238,840 A * 12/1980 Swainson ............... B01J 19/121
358/302
4,274,288 A * 6/1981 Tittmann ............. G01N 29/041
702/166
(Continued)

FOREIGN PATENT DOCUMENTS

GB 2383413 A 6/2003
JP 406137850 * 5/1994

OTHER PUBLICATIONS

Cement and Concrete Research A review of ultrasonic Coda Wave Interferometry in concrete T. Planès, E. Larose ISTerre, Université de Grenoble & CNRS, BP 53, 38041 Grenoble cedex 9, France (Year: 2013).*

(Continued)

Primary Examiner — Jacques M Saint Surin
(74) Attorney, Agent, or Firm — Womble Bond Dickinson (US) LLP

(57) ABSTRACT

A system for inspecting a structure with coda acoustic waves, via a given surface (S) that is accessible from the exterior of the structure. The system operates to acoustically excite the structure at least one determined excitation point (Pe1) of the given surface (S) with an ultrasonic pulse of determined form, measure vibrations at least three set measurement points ($Pm_j$) on the given surface (S), during a time window set with respect to the ultrasonic pulse, and exploit the vibration measurements in order to define an indication (Continued)

(Pd) in the structure of at least one possible defect using a coda acoustic-wave signal at each of the measurement points ($Pm_i$).

15 Claims, 4 Drawing Sheets

(51) Int. Cl.
    *G01N 29/50*     (2006.01)
    *G01N 29/04*     (2006.01)

(52) U.S. Cl.
    CPC ......... *G01N 29/2431* (2013.01); *G01N 29/50* (2013.01); *G01N 2291/0231* (2013.01); *G01N 2291/0423* (2013.01); *G01N 2291/102* (2013.01); *G01N 2291/103* (2013.01); *G01N 2291/2638* (2013.01)

(58) Field of Classification Search
    CPC ..... G01N 2291/103; G01N 2291/2638; G01N 2291/102; G01N 2291/0231; G01N 2291/0423
    USPC .......................................................... 73/587
    See application file for complete search history.

(56) References Cited

U.S. PATENT DOCUMENTS

| | | | | |
|---|---|---|---|---|
| 4,594,897 A | * | 6/1986 | Bantz | G01N 29/28 |
| | | | | 310/336 |
| 5,035,143 A | * | 7/1991 | Latimer | G01N 29/041 |
| | | | | 367/127 |
| 5,801,312 A | * | 9/1998 | Lorraine | G01N 29/069 |
| | | | | 600/443 |
| 5,894,092 A | * | 4/1999 | Lindgren | G01N 29/041 |
| | | | | 73/598 |
| 6,182,512 B1 | * | 2/2001 | Lorraine | G01N 21/1702 |
| | | | | 73/602 |
| 7,921,575 B2 | * | 4/2011 | Little | G01B 5/012 |
| | | | | 33/503 |
| 2010/0126277 A1 | * | 5/2010 | Wu | G01N 29/07 |
| | | | | 73/602 |
| 2014/0236499 A1 | * | 8/2014 | St-Laurent | G01N 29/4454 |
| | | | | 702/36 |

OTHER PUBLICATIONS

T. Planes et al: "A review of ultrasonic Coda Wave Interferometry in concrete", Cement and Concrete Research., vol. 53, Nov. 1, 2013, pp. 248-255, X055391323, ISSN: 0008-8846, DOI : 10.1016/j.cemconres.2013.07009 le document en entier.

Eric Larsoe et al: "Reconstruction of Rayleigh-Lamb dispersion spectrum based on noise obtained from an air-jet forcing", arxiv.org, Cornell University Library, 201 Olin Library Cornell University Ithaca, NY 14853, Oct. 1, 2007, XP080304225, DOI: 10.1121/1.2799913 alinea [00IV]; figures 1-2.

Larose Eric et al: "Locating a small change in a multiple scattering environment", Applied Physics Letters, A I P Publishing LLC, US, vol. 96, No. 20, May 19, 2010, pp. 20410-204101, XP012131285, ISSN: 0003-6951, DOI: 10.1063/1.3431269 abrege: figure 1.

* cited by examiner

SYSTEM AND METHOD FOR INSPECTING A STRUCTURE WITH CODA ACOUSTIC WAVES

FIELD OF THE INVENTION

The present invention relates to the field of the non-destructive inspection of structures, whether these are monolithic or assembled, using the propagation of acoustic waves within the structure.

PRIOR ART

The industrial design of structures, whether these are monolithic or assembled, in particular in aeronautics, often requires an operating for the non-destructive inspection of the structure. Non-destructive inspection allows the designer to check the conformity of the product that they have designed for internal defects that are likely to be formed during manufacture and are likely to affect availability or safety. This is also a need on the part of the user, who is seeking to ensure the integrity of a part or structure over the service life thereof.

Ultrasonic methods are some of the non-destructive inspection methods that are used most often. These methods make it possible to inspect parts, even parts that are opaque.

There are different means for inspecting the part, in particular bidimensional and three-dimensional inspection means.

One example of a bidimensional inspection means is described in GB-A-2383413, in which a surface wave, and in particular a Rayleigh wave, is generated in an infinite structural rail in a longitudinal direction by means of one or more transducers. Receivers placed in a determined set manner along the rail make it possible to locate defects on the surface or close to the surface of the rail.

The three-dimensional inspection means make it possible to analyze the body of a structure. In the vast majority of situations, the ultrasounds are used on an automated means that allows a C-scan imaging method to be carried out.

The C-scan imaging method makes it possible to image the propagation of acoustic waves emitted into the body of the part from the surface. In this process, a transducer scans the surface of the part and acoustic acquisition is carried out point by point over the entirety of this surface. A bidimensional representation of the three-dimensional properties of the part is thus produced.

This method makes it possible to easily locate potential indications present within the part. The method is extremely robust in an industrial environment, justifying its use on a large scale.

However, in most cases, this method requires the inspected structure to be immersed, or at least dampened, which may involve a preliminary operation to protect against the water and an oven-drying operation after the inspection. These operations have costs. In addition, for structures having large dimensions, the inspection means using transducers to implement the C-scan method have to be designed on a corresponding scale, and this may therefore have a high cost.

Methods using laser interferometry to carry out the C-scan method, which can overcome certain limitations linked to the transducers, in particular pre- and post-inspection operations, are conceivable. However, the method requires point-by-point acoustic acquisition, and for structures having large dimensions, this therefore involves a large number of measurements. This inspection may therefore be time-consuming.

There is therefore the need to find a means of using a method for the non-destructive inspection of structures for industrial purposes, which uses ultrasound while maintaining all the advantages thereof but overcoming the above-mentioned limitations.

SUMMARY OF THE INVENTION

For this purpose, the invention relates to a system for inspecting a structure by means of acoustic coda waves from a given surface that is accessible from the exterior of the structure, said system comprising:
- excitation-generating means arranged to acoustically excite said structure at least one determined excitation point on the given surface by means of an acoustic pulse of a determined form,
- at least one measuring means arranged to measure vibrations at least three determined measurement points on the given surface, in a determined time window relative to the acoustic pulse, and
- electronic means arranged to utilize the vibration measurements provided by said measuring means in order to define an indication in said structure of at least one potential defect by using a signal of the acoustic coda waves at each of said measurement points, said system being characterized in that the measuring means are arranged to take the measurements in the air and without contacting the structure.

The indication of the potential defect is preferably an indication of its location. It may also include elements characterizing the type of defect, or its size.

The acoustic pulse preferably has a significant level of energy in an ultrasonic frequency band that can propagate within the structure.

Using measuring means distributed over the surface S and without contact, the invention in particular makes it possible to directly carry out a global characterization of the structure, namely within the body of the structure to identify potential defects therein by means of acoustic coda waves and without needing to prepare the surfaces corresponding to the different measurement points. This absence of restrictions on all of the measurement points means that the cost of the equipment for the non-destructive acoustic inspection system can be drastically reduced and that the number of operations for preparing or repairing the inspected structure is also reduced. In addition, the acoustic coda waves in the present invention are structural coda waves, unlike the surface waves as described in GB-A-2383413. The coda wave is reflected in an indeterminate manner and three-dimensionally in order to obtain a "health status" or detailed information on the body of the structure.

Preferably, said excitation means are also arranged to carry out the excitation in the air and without contacting the structure.

This allows any contact with the structure to be completely eliminated during inspection operations.

According to a feature of the invention, the signal of the acoustic coda waves is between 200 kHz and 1000 kHz.

According to another feature of the invention, the excitation-generating means comprise a compressed air-jet generator.

Preferably, said measuring means are of the interferometric laser type.

Said measuring means comprise an optical system arranged to direct a given laser beam towards the different measurement points.

A system of this type makes it possible to adjust the position of the measurement points using just one laser. It also makes it possible to control the position of the measurement points on the surface S in order to narrow down the position of a defect.

The acoustic inspection system may further comprise ultrasonic inspection means of the C-scan type, which are arranged to be implemented on the structure in the proximity of a potential defect.

The invention also relates to a method for inspecting a structure by means of acoustic coda waves from a given surface that is accessible from the exterior of the structure, said method comprising:
- a step a) of acoustically exciting said structure at least one determined excitation point on the given surface by means of an acoustic pulse of a determined form,
- a step b) of measuring vibrations of the structure at least three determined measurement points on the given surface, in a determined time window after the acoustic pulse,
- a step c) of utilizing vibration measurements of the structure in order to define an indication of a potential defect, or a plurality of potential defects, in said structure by using a signal of the acoustic coda waves at each of said measurement points, said method being characterized in that, in step b), the measurements are taken without bringing a measuring device into contact with the structure.

Preferably, in step a), the acoustic excitation of the structure is carried out without bringing an excitation device into contact with the structure.

According to a feature of the method, the signal of the acoustic coda waves is between 200 kHz and 1000 kHz.

Advantageously, in step b), the measurements are taken by implementing a laser interferometry method.

According to another feature, the measuring device carries out triangulation of the three measurement points.

According to yet another feature, the measuring device carries out scanning of the measurement points.

The method may further comprise, when a potential defect is located, a complementary step involving defining at least three new measurement points on the given surface which are closer to said defect than each of the measurement points used previously, and a new sequence for carrying out steps a), b) and c), using said new measurement points.

This sequence makes it possible to narrow down the position of a potential defect.

Advantageously, the method may also further comprise implementing a method for ultrasonic inspection of the C-scan type on the structure in the proximity of a potential defect.

BRIEF DESCRIPTION OF THE DRAWINGS

The present invention will be better understood and other details, features and advantages of the present invention will become clearer upon reading the following description of a non-limiting example, with reference to the accompanying drawings, in which.

DESCRIPTION OF AN EMBODIMENT

An acoustic inspection system according to the invention uses the propagation of a coda acoustic wave or a coda ultrasonic acoustic wave in accordance with a method of which the main features will first be explained very briefly.

Figure 1:
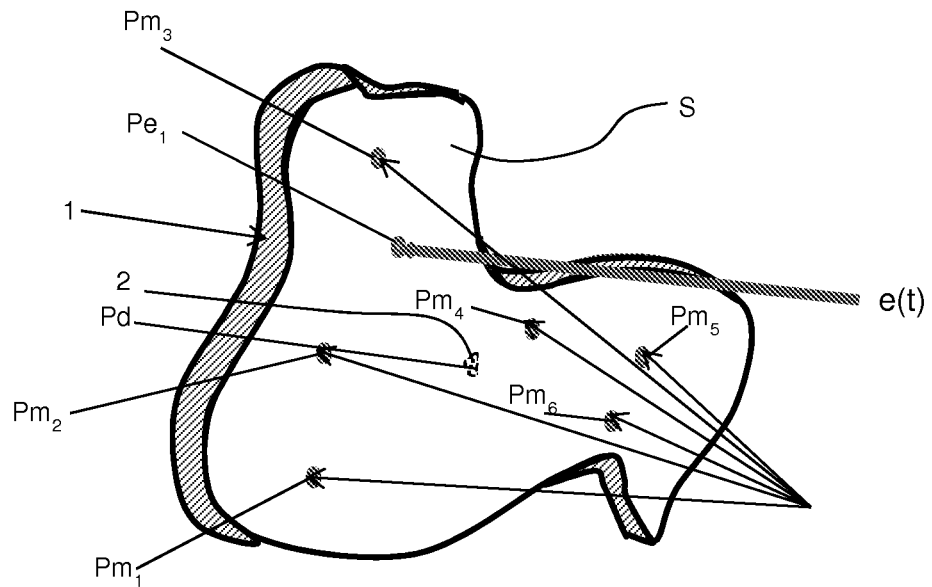
FIG. 1 is a schematic view of a first variant of the method for measuring by means of acoustic coda waves as used in the invention.

With reference to FIG. 1, the ultrasonic coda wave makes it possible to define a method that can be used on a structure 1 being inspected in order to detect the potential presence of one or more defects, preferably by characterizing said defects. A defect 2, as indicated in FIG. 1, may be confined to the interior of the structure 1, and therefore it may not be possible to detect said defect visually. The method makes it possible to carry out this inspection from measurements taken on a single accessible surface S of said structure 1.

When an excitation e(t) is applied to the structure 1, for example at a point $Pe_1$, the first acoustic waves arriving at a point $Pm_i$ (i=1 to 6 in FIG. 1) on the surface S are body waves or surface waves that have followed a trajectory which is either direct or has a low number of reflections. The waves that arrive latest have been diffused multiple times due to the complexity of the structure 1, and the trajectories thereof are long and complex. In other words, the coda waves propagate in an indeterminate manner within the body of the structure.

If the vibrations $h_i(t)$ are measured on the surface S at the point $Pm_i$, the last part of the signal $h_i(t)$ corresponds to said waves that have been diffused multiple times, referred to as coda waves. The signal of the coda wave has the appearance of a noise. However, said ultrasonic coda wave $h_i(t)$ has two particular features. First, it is extremely reproducible for a given excitation e(t). Second, it is very sensitive to the defects or disruption in the material of the structure 1, in particular in terms of the amplitude and the time lag.

The ultrasonic coda signal can therefore be used to identify defects in the structure. Known methods have been developed, for example for concrete structures, which make it possible to locate and characterize defects in structures in situ from acoustic vibration measurements at a plurality of points on the surface of said structures. These methods are based on ultrasonic coda signal propagation theories, which allow potential defects to be identified in the volume of the structure, using either a theoretical model of the structure or comparisons with measurements on a reference structure. By distributing the measurement points $Pm_i$, it is for example possible to carry out triangulation between said points in order to locate a defect.

In addition, it has become apparent that these methods, which are not based on a linear theory, for example C-scan technology, are particularly well suited to complex structures and/or to identifying defects that do not have a linear response to the acoustic waves.

Figure 5:
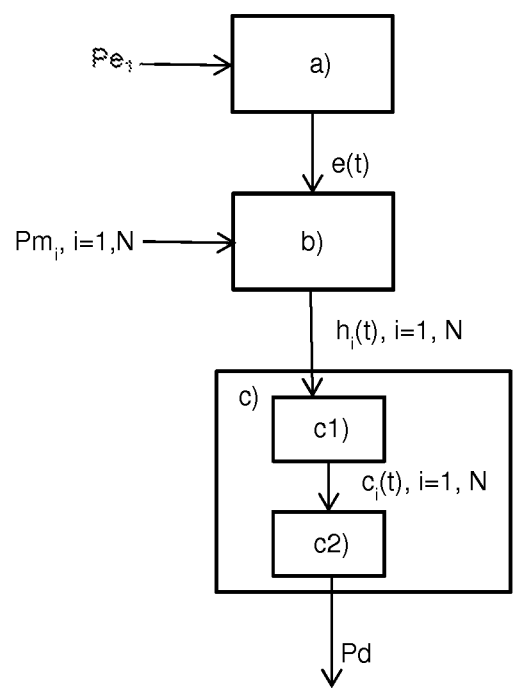
FIG. 5 is a flow diagram of a method according to the invention.

With reference to FIGS. 1 and 5, one example of the method uses, in a first step a), a calibrated excitation e(t) at a given point $Pe_i$ on the surface S. For several reasons, the coda signal seems to be found in the ultrasonic range, generally between 200 kHz and 1000 kHz, or potentially between 200 Hz and 1000 Hz, giving the name ultrasonic coda wave. The excitation e(t) therefore has to have enough energy in the ultrasonic frequency band propagated by the structure 1.

In a second step b), the vibrations on the surface S over time at a series of points $Pm_i$ (i=1 to N) distributed over the surface S are carried out after the excitation e(t) is initiated. The distribution of the points $Pm_1$-$Pm_N$ is therefore defined in order to observe a part of the volume of the structure in which there is a risk of potential defects. In FIG. 1, the number N of measurement points $Pm_i$ is equal to 6. However, this is only an example. This number and the distribution will depend on the complexity of the structure. Preferably, the number N is at least equal to 3, in order for triangulation to be carried out.

A third step c) of signal processing utilizes the measures for identifying a potential defect 2.

It has a first sub-step c1), in which the signal $h_i(t)$ provided at each measurement point $Pm_i$ is processed in order to extract the ultrasonic coda signal $c_i(t)$ therefrom.

It then has a sub-step c2), in which the ultrasonic coda signal $c_i(t)$ at different measurement points $Pm_i$ is utilized by using the above-mentioned theories in order to identify a potential defect 2, for example by means of triangulation. This step provides a location Pd of said defect 2, for example.

It is noted that the ultrasonic coda signal contains multiple pieces of information, which may also make it possible to characterize the potential defect 2. In fact, holes or cracks do not have the same linear or non-linear response to the acoustic waves.

Figure 2:
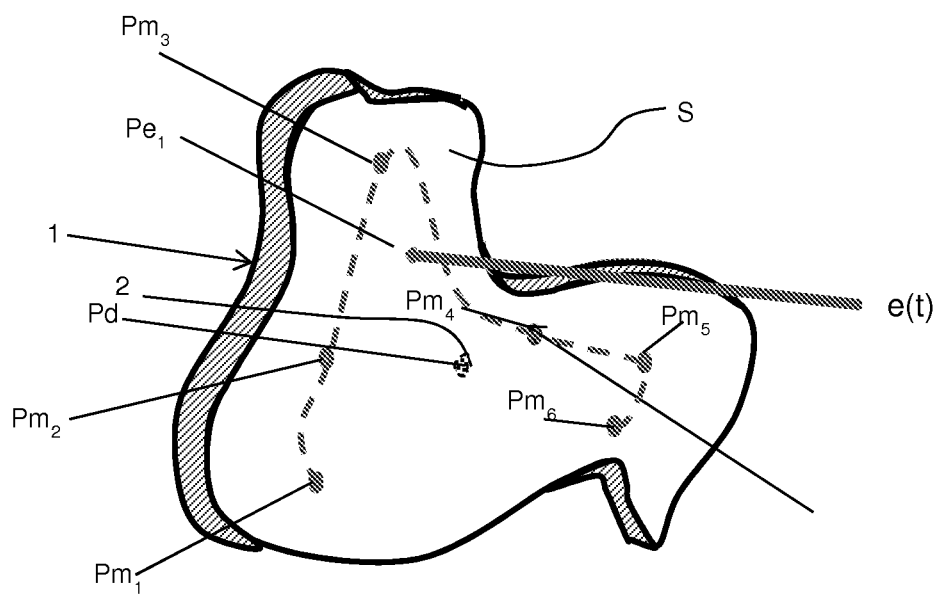
FIG. 2 is a schematic view of a second variant of the method for measuring by means of acoustic coda waves as used in the invention.

With reference to FIG. 2, the preceding method may have a variant for implementing the two first steps. Indeed, since the signal is highly reproducible, there is no obligation to take all the measurements at the same time, i.e. to have a plurality of measuring means in parallel. A single measuring means can scan the measurement points. The first variant can be simulated by successively positioning the measuring device at each of the measurement points $Pm_1$ to $Pm_N$, then reproducing the excitation e(t) each time and taking the measurement for the current point in the same time window relative to said excitation.

Figure 3:
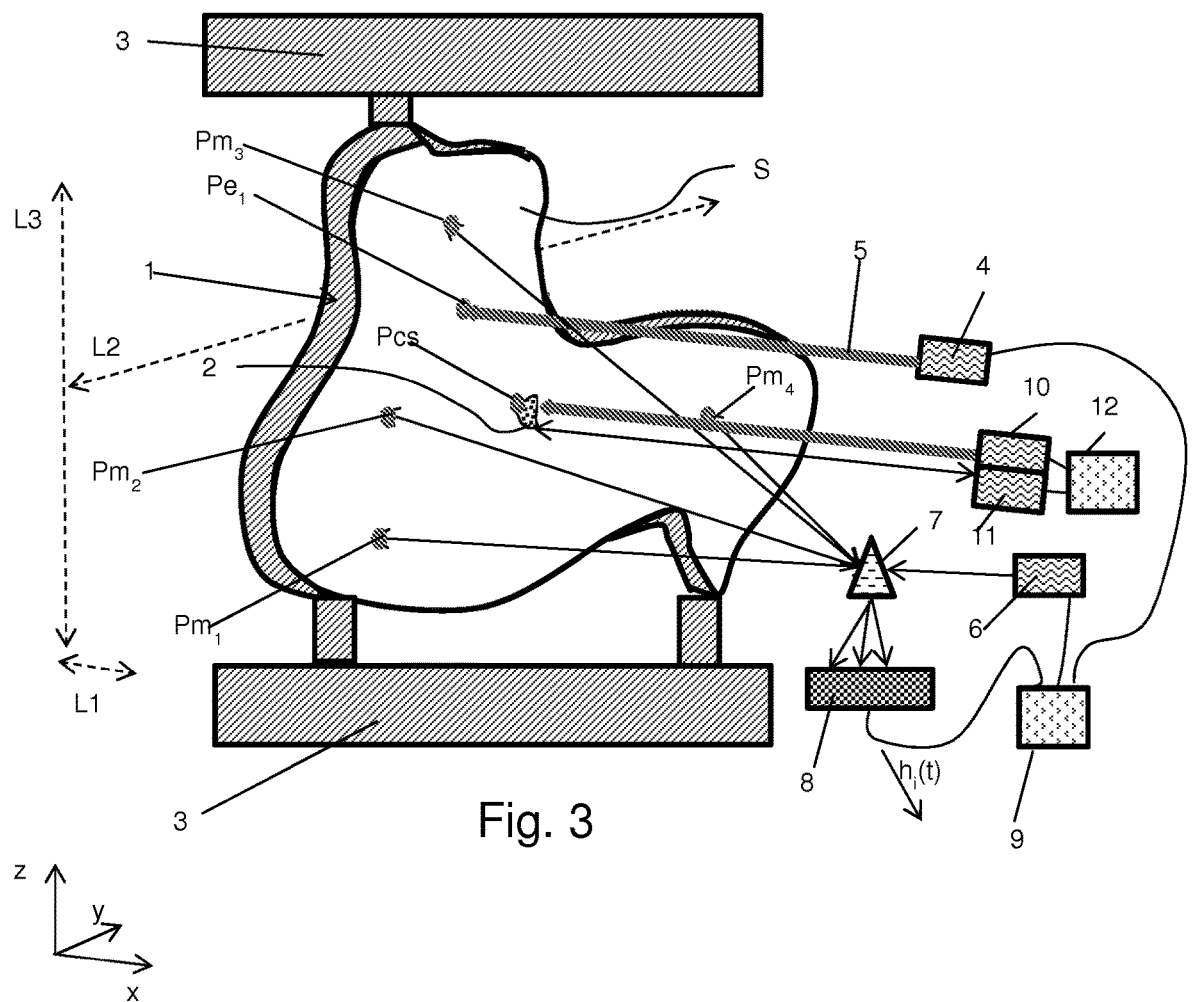
FIG. 3 is a schematic view of a test bench according to the invention, with the structure to be inspected.

With reference to FIG. 3, a control system according to the invention is defined in order to make it possible to inspect a structure 1. The composition of the structure is not detailed in the figure. The structure is for example a part of an aeronautical component, such as a nacelle element. It may be monolithic, for example made of a determined composite material, or may be formed by assembly, for example from a plurality of layers of different materials or from a plurality of parts.

The structure 1 may have a complex shape. It has characteristic dimensions L1, L2, L3 in the three dimensions x, y, z of space, respectively. In general, one of said dimensions is large relative to the dimensions of a measuring zone accessible to means of the ultrasonic C-scan type.

As mentioned above, the inspection can be carried out on the structure 1 in situ, i.e. on an aeronautical part installed in a turbine engine or in an aircraft. The inspection may also be carried out on the structure 1 alone. In this second case, the inspection system preferably comprises means 3, shown in FIG. 3, that make it possible to keep the structure in reproducible conditions if the aim is to track the state thereof in different use steps.

In both cases, the inspection is carried out on a structure 1 that is kept in ambient air, preferably in a room or building that insulates said structure from uncontrolled acoustic stresses.

The structure 1 positioned for inspection has a surface S that is, in the example, accessible in directions having a main component in the x dimension. In addition, the inspection system is configured to make it possible to identify the general position of the structure 1 and the location of points on the surface S with good spatial precision.

In this case, the inspection system comprises a compressed air-jet 5 generator 4, positioned to face the surface S and arranged to project a compressed air jet onto a determined point $Pe_i$ on the surface S, the coordinates of which are preferably known.

Said generator 4 is arranged such that the compressed air jet 5 causes vibratory excitation in a temporal e(t), reproducible form at the point $Pe_i$, which transfers energy in an ultrasonic frequency range appropriate for the structure 1. The excitation produced at the point $Pe_i$ by the compressed air jet 5 from the generator 4 thus results in the propagation of an ultrasonic coda wave in the structure 1.

The compressed air jet 5 generator 4 may be positioned at a distance from the structure, without coming into contact therewith, and may be oriented such that the position of the excitation point $Pe_i$ can be easily modified. It is also conceivable, according to an embodiment that is not shown, to arrange a plurality of compressed air-jet generators that can be actuated simultaneously and are aimed at points distributed over the structure 1 in order to transfer more energy thereto.

In a variant that is not shown, the compressed air-jet generator 4 may be replaced by speakers that focus their sound towards the point $Pe_i$.

In another variant, which is not shown either, this may be a laser generator that emits a laser pulse, such that the structure 1 is not damaged by said pulse.

Said different variants have the advantage of there being no contact between the excitation device 4 and the structure 1. It is however also conceivable to position a piezoelectric transducer on the surface S at the determined point $Pe_i$ in order to excite the structure 1.

The inspection system also comprises at least one device for measuring the vibrations on the surface S, preferably by means of laser interferometry.

In the example in FIG. 3, in a first variant, the measuring device comprises a laser generator 6 and the laser beam propagates through the air. An optical device 7, for example a system of mirrors, separates the laser beam into a plurality of beams that impinge on the surface S at N determined measurement points $Pm_i$-$Pm_N$, of which the number N is at least equal to 3, namely equal to 4 in the example in FIG. 3.

In accordance with the principle of laser interferometry (not shown in the drawings), each of the beams emitted towards a point $Pm_i$ (i=1 to N) is split in two, with one being reflected by the structure 1 and the other being reflected by a reference mirror, and the two beams are then recombined so as to visually display the displacements of the inspected surface at the point $Pm_i$ at a resolution which may go down to the nanometer. The acquisition is carried out in an acquisition means 8 comprising as many acquisition channels as there are points $Pm_i$ at which a laser beam is aimed. This acquisition system outputs a signal $h_i(t)$ of the temporal measurement of the normal displacements of the surface S at each measurement point $Pm_i$.

In a first variant (not shown), the laser beam produced by the laser generator 6 can be guided by optical fibers. In this case, it can be divided and can also follow a plurality of optical fibers that are each aimed at a measurement point $Pm_i$ on the surface S.

In another variant, the acquisition means 8 may only comprise one single acquisition channel. In this case, the measuring device is arranged such that the laser beam output from the optical device 7 successively scans over the measurement points $Pm_1$ à $Pm_N$ during a determined time window after separate excitations e(t), which are identically reproduced after the measurement of the ultrasonic coda wave from the preceding points.

The inspection system also comprises an electronic computer 9 arranged to control the excitation device(s) 4 and the measuring device 6-7-8. Advantageously, said electronic computer 9 is also arranged to extract the ultrasonic coda signal $c_i(t)$ from each of the signals $h_i(t)$ transmitted by the acquisition means 8 and to execute the calculation programs that allow the ultrasonic coda signals $c_i(t)$ to be utilized, in order to deduce therefrom or even characterize locations of potential defects 2 in the structure 1.

Advantageously, the inspection system also comprises an ultrasonic C-scan measuring device, the principle of which is briefly explained at the outset. This device comprises a transducer/recorder which can scan a localized zone of the structure around a point Pcs on the surface S. Advantageously, as shown in FIG. 3, the transducer/recorder may be made up of, as is the case for the device for measuring the ultrasonic coda signal, a generator 10 of directional acoustic pulses at the point Pcs on the surface S, for example of the jet generator type, and of a means 11 for measuring the acoustic response reflected at the point Pcs by laser interferometry. This transducer/recorder can scan a restricted zone around a given point Pd on the surface S so as to provide a C-scan image of the volume of the structure in the region of the defect 2.

Potentially, even if it is not shown, the transducer/recorder 10-11 may be positioned in front of a point on another surface (not shown) of the structure 1, if it becomes apparent that the zone of the structure 1 to be inspected is more clearly visible from this other surface by means of the C-scan method.

In addition, the transducer/recorder 10-11 is connected to a computer 12 arranged to carry out the signal processing that allows the image of the inspected zone to be obtained. This computer may be the same as the computer 9.

A method for inspecting a structure 1 using the system which has just been described may comprise the following steps.

In a preliminary step, the structure 1 is correctly positioned relative to the inspection system, in a determined configuration, such that the surface S is accessible to the excitation generator 4, to the remote measuring means 6-7-8, and, potentially, to the transducer/recorder 10-11. This configuration may correspond either to its position of use in a global system, such as an aircraft, or, as shown in FIG. 3, to a support in support means 3 dedicated to the inspection system.

Figure 4:
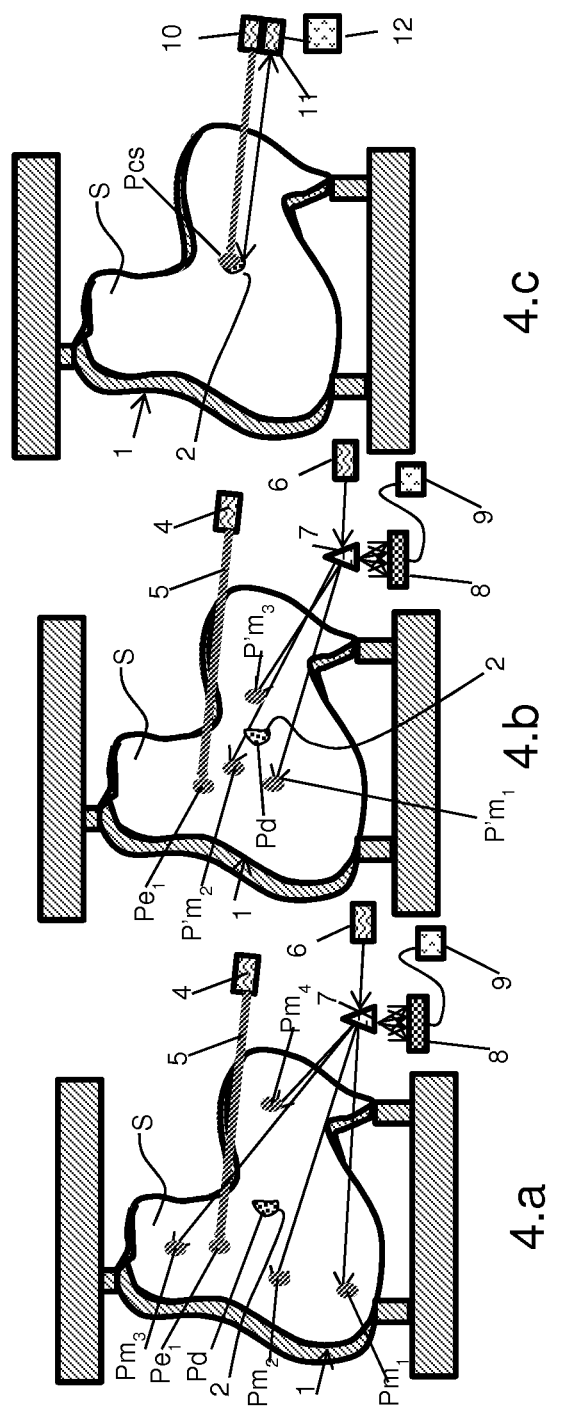
FIGS. 4a, 4b and 4c are schematic views of three sequences of a method according to the invention, implemented using the test bench from FIG. 3.

With reference to FIGS. 4a, 4b and 4c, the method may comprise three sequences.

A first sequence, shown in FIG. 4a, involves implementing steps of one of the two previously explained variants of the ultrasonic coda method.

In these two variants, the excitation generator 4 is used to emit a given excitation towards a point Pe1 on the surface S. The Pe1 is generally selected such that the acoustic energy of the excitation may radiate into as much as possible of the volume of the structure, such that the measurements can be utilized.

In this case, the first variant, as mentioned in relation to FIG. 1, uses the laser generator 6, the optical system 7 and the multi-channel acquisition means 8 in order to simultaneously take the measurements at the N measurement points $Pm_1$-$PM_N$ and to thus carry out steps a) and b) of the previously described method.

In an alternative that is not described, the inspection system could use a plurality of less complex, separate laser measuring systems. Likewise, if the system is limited to a less complex laser measuring system that can take a point-by-point measurement, the second variant of the method may be applied, which has been mentioned in relation to FIG. 2.

It is also possible to combine the two variants by grouping the measurement points into subsets and carrying out successive simultaneous measurements on each of the subsets.

The next part of the sequence is constituted by signal processing corresponding to step c) of the previously described method, which is carried out in the computer 9 in order to locate and even characterize a potential defect 2.

If the structure has very large dimensions, the two variants of this first sequence may be arranged. In this case, which is not shown, the acoustic inspection system comprises a plurality of acoustic excitation generators similar to that 4 shown. Therefore, each of the excitation generators is oriented towards a different point Pei on the surface S, such that there is a plurality of excitation sources to transfer enough acoustic energy to the structure 1. At the same time, the number N of measurement points may be increased in order to cover the surface S in a regular manner.

If, at the end of said sequence, no defects have been detected or if it is considered that the detected defects 2 have been sufficiently well located and characterized, the method can stop.

If it is considered that it is necessary to better locate a defect 2 identified during the first sequence, it is possible to engage a second sequence.

For this second sequence, as shown in FIG. 4b, a set of N' (N' is equal to 3 in the example) measurement points P'mi is redefined by bringing them closer to the estimated position Pd of the defect 2 so as to increase the precision of the algorithms used to locate the defect 2 by utilizing the ultrasonic coda wave, during the sub-step c1), as mentioned in relation to FIG. 5.

The second sequence is thus carried out in the same way as the first sequence by utilization of the ultrasonic coda wave, using the new set of measurement points $P'm_1$-$P'm_{N'}$.

If it is considered, either after the first sequence or after the second sequence, that the defect 2 needs to be better characterized or better located in terms of depth relative to the surface S, it is also possible to apply a third sequence.

In this third sequence, the transducer/recorder is used to carry out C-scan imaging around a point Pcs on the surface S located above the zone in which the defect is located. This sequence thus makes it possible to visually display the defect 2 using means which are different from the ultrasonic coda wave method and of which the interpretation is well established. It therefore makes it possible to improve the characterization of the defect 2.

The invention claimed is:

1. System for inspecting a structure by means of acoustic coda waves from a given surface (S) that is accessible from the exterior of the structure, said system comprising:

excitation-generating means arranged to acoustically excite said structure at least one set excitation point ($Pe_1$) on the given surface (S) by means of an acoustic pulse (e(t)) of a determined form, at least one measuring means arranged to measure vibrations ($h_i(t)$) at least three determined measurement points ($Pm_i$) on the given surface (S), in a determined time window relative to the acoustic pulse (e(t)), electronic means arranged to utilize the vibration measurements ($h_i(t)$) provided by said measuring means in order to define an indication (Pd) in said structure of at least one potential defect, said system wherein said electronic means are configured to extract a signal of the structural acoustic coda waves (ci(t)) to the measured vibration (hi(t)) in each of said measurements points (Pmi), said at least one measuring means are arranged to take the measurements in the air and without contacting the structure.

2. The system according to claim 1, wherein said excitation means are arranged to carry out the excitation (e(t)) in the air and without contacting the structure.

3. The system according to claim 1, wherein the signal of the acoustic coda waves ($c_i(t)$) is comprised between 200 kHz and 1000 kHz.

4. The system according to claim 1, wherein the excitation-generating means comprise a compressed air-jet generator.

5. The system according to claim 1, wherein said measuring means are of the interferometric laser type.

6. The system according to claim 1, wherein said measuring means comprise an optical system arranged to direct a given laser beam towards the different measurement points ($Pm_i$).

7. The system according to claim 1, further comprising ultrasonic inspection means of the C-scan type, which are arranged to be implemented on the structure in the proximity (Pcs) of a potential defect.

8. Method for inspecting a structure by means of acoustic coda waves from a given surface (S) that is accessible from the exterior of the structure, said method comprising:

a step a) of acoustically exciting said structure at least one set excitation point ($Pe_1$) on the given surface (S) by means of an acoustic pulse (e(t)) of a determined form, a step b) of measuring vibrations ($h_i(t)$) of the structure at least three set measurement points ($Pm_i$) on the given surface (S), in a determined time window after the acoustic pulse (e(t)), a step c) of utilizing vibration measurements ($h_i(t)$) of the structure in order to define an indication of at least one potential defect in said structure, said method wherein, in the step c), a signal of the structural acoustic coda waves (ci(t)) is extracted to the measured vibration (hi(t)) in each of said measurements points (Pmi) and in step b), the measurements are taken without bringing a measuring device into contact with the structure.

9. The method according to claim 8, wherein, in step a), the acoustic excitation (e(t)) of the structure is carried out without bringing an excitation device into contact with the structure.

10. The method according to claim 8, wherein the signal of the acoustic coda waves ($c_i(t)$) is comprised between 200 kHz and 1000 kHz.

11. The method according to claim 8, wherein, in step b), the measurements are taken by implementing a laser interferometry method.

12. The method according to claim 8, wherein the measuring device carries out triangulation of the three measurement points ($Pm_i$).

13. The method according to claim 8, wherein the measuring device carries out scanning of the measurement points ($Pm_i$).

14. The method according to 8, further comprising, when a potential defect is located, a complementary step involving defining at least three new measurement points ($P'm_1$-$P'm_4$) on the given surface (S) which are closer to said defect than each of the measurement points ($Pm_1$-$Pm_6$) used previously, and a new sequence for carrying out steps a), b) and c), using said new measurement points ($P'm_1$-$P'm_4$).

15. The method according to claim 6, further comprising Ultrasonic inspecting the C-scan type on the structure in the proximity (Pcs) of a potential defect.

* * * * *